US008791947B1

(12) United States Patent
Kontkanen (10) Patent No.: US 8,791,947 B1
(45) Date of Patent: Jul. 29, 2014

(54) LEVEL OF DETAIL BLURRING AND 3D MODEL DATA SELECTION

(71) Applicant: Google Inc., Mountain View, CA (US)

(72) Inventor: Janne Matias Kontkanen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/132,683

(22) Filed: Dec. 18, 2013

(51) Int. Cl.
 *G06T 17/00* (2006.01)

(52) U.S. Cl.
 USPC ........................................... 345/420

(58) Field of Classification Search
 None
 See application file for complete search history.

(56) References Cited

FOREIGN PATENT DOCUMENTS

EP          2327055 B1       8/2012

OTHER PUBLICATIONS

Lee, Sungkil, G. Jounghyun Kim, and Seungmoon Choi. "Real-time depth-of-field rendering using anisotropically filtered mipmap interpolation." Visualization and Computer Graphics, IEEE Transactions on 15.3 (2009): 453-464.*
Kosara, R., Miksch, S., & Hauser, H. (Oct. 2001). Semantic depth of field. In Information Visualization, IEEE Symposium on (pp. 97-97). IEEE Computer Society.*
Reiners, Dirk. "Scene graph rendering." Proceedings of IEEE Virtual Environments (2002): 1-18.*
"After Effects Help/3D Channel effects", Adobe, Copyright 2014, <http://help.adobe.com/en_US/aftereffects/cs/using/WS38785266 89cb91655866c1103a9d3c597-7bd9a.html#WS3878526689cb91 655866c1103a9d3c597-7bd8a >.
Christensen, et al., "Ray Differentials and Muliresolution Geometry Caching for Distribution Ray Tracing in Complex Scenes", Eurographics 2003, vol. 22, No. 3, 2003.
Demers, Joe, "Chapter 23. Depth of Field: A Survey of Techniques". CPU Gems, Developer Zone, copyright 2004, <http://http.developer. nvidia.com/GPUGems/gpugems_ch23.html>.
Hammon Jr., Earl, "Chapter 28: Practical Pot-Process Depth of Field", GPU Gems 3, Copyright 2008 NVIDIA Corporation, <http:// http.developer.nvidia.com/GPUGems3/gpugems3_ch28.html>.
Jeong, et al., "Real-Time Defocus Rendering With Level of Detail and Sub-Sample Blur", Computer Graphics forum, vol. 32, No. 6, 2013, pp. 126-134.
Kopriva, "Camera Lens Blur effect and camera depth of feild properties in After Effects CS5.5", After Effects New, Information & Workflows from Users & Adobe Ae Team, Apr. 13, 2011.
Patterson, "Easy Depth of Field Effect in Photoshop", Copyright 2014, <http://www.photoshopessentials.com/photo-effects/depth-of-field/>.
Wikipedia, "Circle of confusion", Wikipedia, The Free Encyclopedia, last modified on Nov. 15, 2013, <http://en.wikipedia.org/wiki/ Circle_of_confusion>.

* cited by examiner

*Primary Examiner* — David Zarka
*Assistant Examiner* — Vu Nguyen
(74) *Attorney, Agent, or Firm* — Lerner, David, Littenberg, Krumholz & Mentlik, LLP (57) ABSTRACT

A set of nodes for rendering a 3D model using a set of camera parameters based on at least a threshold error value may be selected. Each node corresponds to a bundle of data for rendering a geographic area at a particular resolution and the camera parameters including a point of view for rendering the 3D model. For a given node of the set of nodes, a smallest circle of confusion within a bounding box of the geographic area of the given node may be determined using the set of camera parameters closest to a particular parameter of the set of camera parameters. A diameter of the smallest circle of confusion is compared to the threshold error value. Based on this comparison, the threshold error value is adjusted. The adjusted threshold error value is used to select a new node to replace the given node in the set of nodes.

20 Claims, 12 Drawing Sheets

LEVEL OF DETAIL BLURRING AND 3D MODEL DATA SELECTION

BACKGROUND

Various systems allow users to view images of three-dimensional ("3D") models. These 3D models may include representations of various locations and objects at those locations such as buildings, vegetation, bodies of water, etc. In some instances, the 3D models may have therewith associated textures (e.g., a brick texture might be associated with a 3D model of a wall in order to have it rendered to appear like a brick wall). The rendering of the 3D model along with the texture may provide a viewer with an immersive experience as if he or she were viewing the simulated location from a particular viewpoint.

SUMMARY

Aspects of the disclosure provide a computer-implemented method. The method includes selecting, by one or more computing devices, from a plurality of nodes, a set of nodes for rendering a 3D model using a set of camera parameters based on at least a threshold error value, each node corresponding to a bundle of data for rendering aspects of the 3D model at a particular resolution and the set of camera parameters including a point of view for rendering the 3D model; for a given node of the set of nodes, determining, by the one or more computing devices, a smallest circle of confusion within a bounding box of a geographic area of the given node using the set of camera parameters closest to a particular parameter of the set of camera parameters; comparing, by the one or more computing devices, a diameter of the smallest circle of confusion to the threshold error value; adjusting, by the one or more computing devices, the threshold error value based at least in part on the diameter and the comparison; and selecting, by the one or more computing devices, a new node of the plurality of nodes to replace the given node in the set of nodes based on at least in part the adjusted threshold error value to select.

In one example, the method also includes rendering the 3D model using the set of nodes including the new node. In another example, the method also includes adjusting the threshold error value only when the diameter of the smallest circle of confusion is greater than the threshold error value. In another example, the new node has a coarser particular resolution than the given node. In another example, the particular parameter is a focal distance for the 3D image. In another example, adjusting the threshold error value includes multiplying the diameter by the threshold error value. In another example, the method also includes receiving user input indicating a focus point and selecting the set of nodes is further based on the focus point. In this example, the method also includes using the focus point to determine a focal distance, and the focal distance is the particular parameter of the set of camera parameters.

Another aspect of the disclosure provides a system. The system includes one or more computing devices. The one or more computing devices are configured to: select, from a plurality of nodes, a set of nodes for rendering aspects of a 3D model using a set of camera parameters based on at least a threshold error value, each node corresponding to a bundle of data for rendering aspects of the 3D model at a particular resolution and the set of camera parameters including a point of view for rendering the 3D mode; for a given node of the set of nodes, determine a smallest circle of confusion within a bounding box of a geographic area of the given node using the set of camera parameters closest to a particular parameter of the set of camera parameters; compare a diameter of the smallest circle of confusion to the threshold error value; adjust the threshold error value based at least in part on the diameter and the comparison; and select a new node of the plurality of nodes to replace the given node in the set of nodes based on at least in part the adjusted threshold error value to select.

In one example, the one or more computing devices are also configured to render the 3D model using the set of nodes including the new node. In another example, the new node has a coarser particular resolution than the given node. In another example, the particular parameter is a focal distance for the 3D image. In another example, the one or more computing devices are also configured to adjust the threshold error value by multiplying the diameter by the threshold error value. In another example, the one or more computing devices are also configured to receive user input indicating a focus point and select the set of nodes further based on the focus point. In this example, the one or more computing devices are further configured to use the focus point to determine a focal distance, and the focal distance is the particular parameter the set of camera parameters.

A further aspect of the disclosure provides a non-transitory computer-readable storage medium storing instructions. The instructions when executed by one or more processors, cause the one or more processors to perform a method. The method includes selecting from a plurality of nodes, a set of nodes for rendering a 3D model using a set of camera parameters based on at least a threshold error value, each node corresponding to a bundle of data for rendering aspects of the 3D model at a particular resolution and the set of camera parameters including a point of view for rendering the 3D mode; for a given node of the set of nodes, determining a smallest circle of confusion within a bounding box of a geographic area of the given node using the set of camera parameters closest to a particular parameter of the set of camera parameters; comparing a diameter of the smallest circle of confusion to the threshold error value; adjusting the threshold error value based at least in part on the diameter and the comparison; and selecting a new node of the plurality of nodes to replace the given node in the set of nodes based on at least in part the adjusted threshold error value to select.

In one example, the method also includes rendering the 3D model using the set of nodes including the new node. In another example, the method also includes adjusting the threshold error value only when the diameter of the smallest circle of confusion is greater than the threshold error value. In another example, the new node has a coarser particular resolution than the given node. In another example, the particular parameter is a focal distance for the 3D image.

DETAILED DESCRIPTION OVERVIEW

The technology relates generally to altering an image of a 3D model by blurring that image to give the user the impression that he or she is looking through a camera. This also allows for the use of a coarser level of detail in areas of the image that will appear to be out of focus than those areas that will appear to be in sharper focus. For example, a user may want to view an image of a 3D model of a location on a display of the user's client device. Areas of the image may be blurred in order to simulate what the user would see through a camera lens: the area at or close to the focal plane will be in sharp focus while other areas may appear to be blurry. This is known as the depth of field effect. As the user changes the orientation or focus of the 3D model in the image, the blurred areas may change. Again, for areas of the image that are to be blurred, the amount of data required for rendering those area may be less than that required for areas that are to be rendered in focus. In this regard, the blurring may be used as a signal to select what data will be rendered in order to display the image.

When a 3D model or scene is rendered, the data that makes up the 3D model may be available at various resolutions. For efficiency reasons, less detailed models may be used to render objects that will appear farther from a camera (corresponding to the point of view of a user viewing the 3D image) can improve efficiency. More detailed models can be used to render objects that will appear closer from the camera. As an example, the different levels of details can be organized into a hierarchy, where a root node represents the entire 3D model with the coarsest accuracy or resolution and the nodes extending from the root have greater accuracy or resolution, and so on until the nodes having the finest accuracy. The nodes of this hierarchy can be referred to as nodes or levels of detail.

In order to render an image of a 3D model, different nodes may be selected to render a single image. In this regard, nodes may be selected using a level of detail criteria that is fixed or determined based on a priori knowledge about the accuracy of each node and properties of the camera viewing the node. This information may be used to determine a single threshold error value for the entire image. If the error associated with a node is too large, for example, greater than the threshold error value, then the children of that node may be considered instead of the node that would cause too much error, and so on. The result of this selection is a list of nodes that will be below the same threshold error value and that will be queued to be rendered in order to display the image.

A blur kernel may be used to implement the blurring. The size of the blur kernel will determine the amount of blur at the different pixels in the image. In the depth of field example, the blur kernel may be set to a diameter of a circle of confusion. The larger the diameter at a particular point in the image, the more blurry that point will be rendered. Thus, objects with a small circle of confusion will appear closer to the focal plane and have little or no blur.

To blur an image, the diameter of the circle of confusion may be determined for the pixels of the image based on the camera parameters for the image to be displayed, including the aperture, focal distance, and the location. The blur may then be applied by sampling within the circle of confusion for that pixel. In one example, a pre-computed Poisson disk distribution may be used to sample within the diameter of the circle of confusion.

This sampling and blurring with depth of field may be used to adjust the level of detail criteria required at each node. As an example, the smallest circle of confusion within a bounding box of the selected node may be estimated. The bounding box of a node may include a box that tightly contains the geometry associated with the node. This may be done by finding the distance that is within the distance range of the bounding box of the node that is closest to focal distance of the image to be displayed. At that distance, the circle of confusion may be computed, again based on the properties of the camera lens described above. If the circle of confusion has a diameter larger than the threshold value the diameter may be used to adjust the threshold error value. This adjusted threshold error value may be used to select a different node with coarser geometry.

Example Systems

Figure 1:
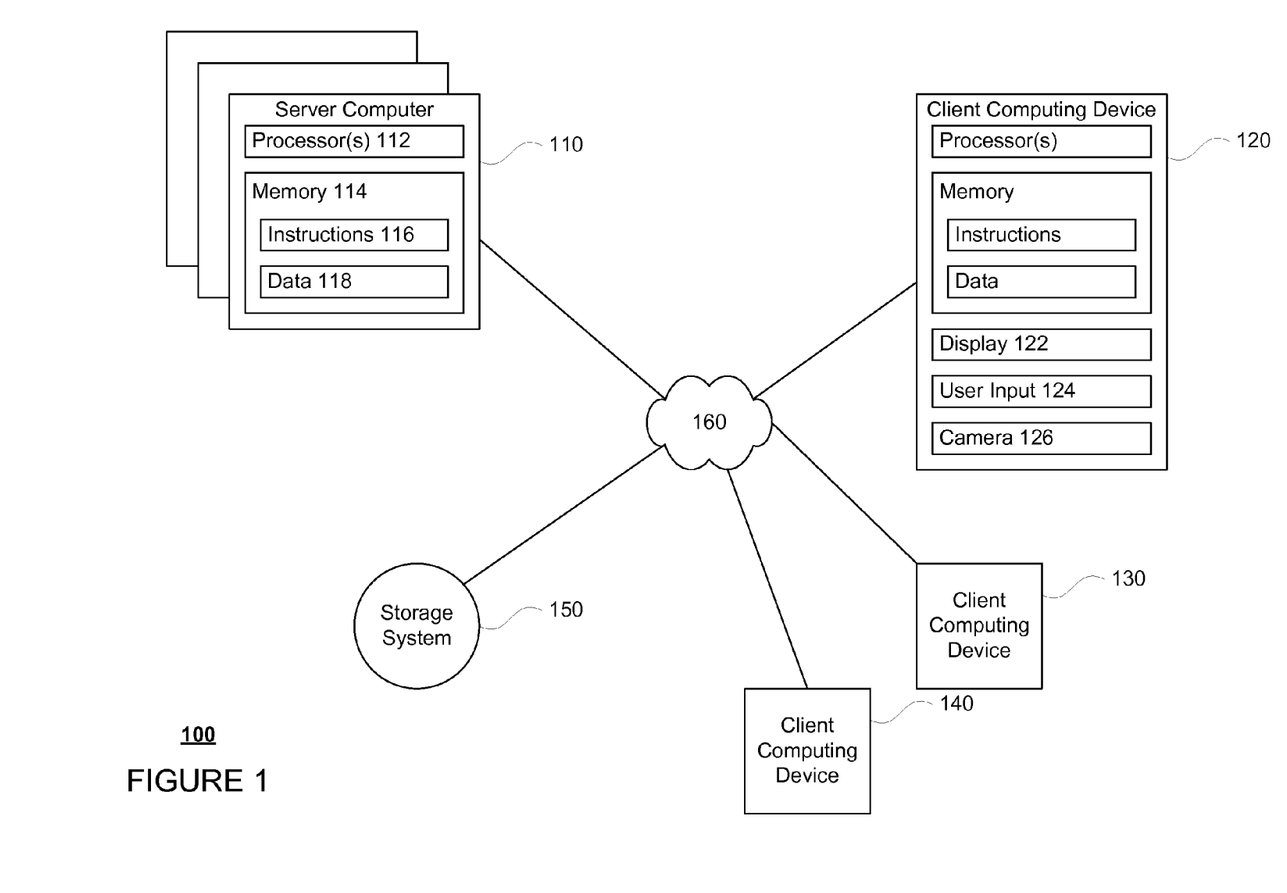
FIG. 1 is a functional diagram of an example system in accordance with aspects of the disclosure.
Figure 2:
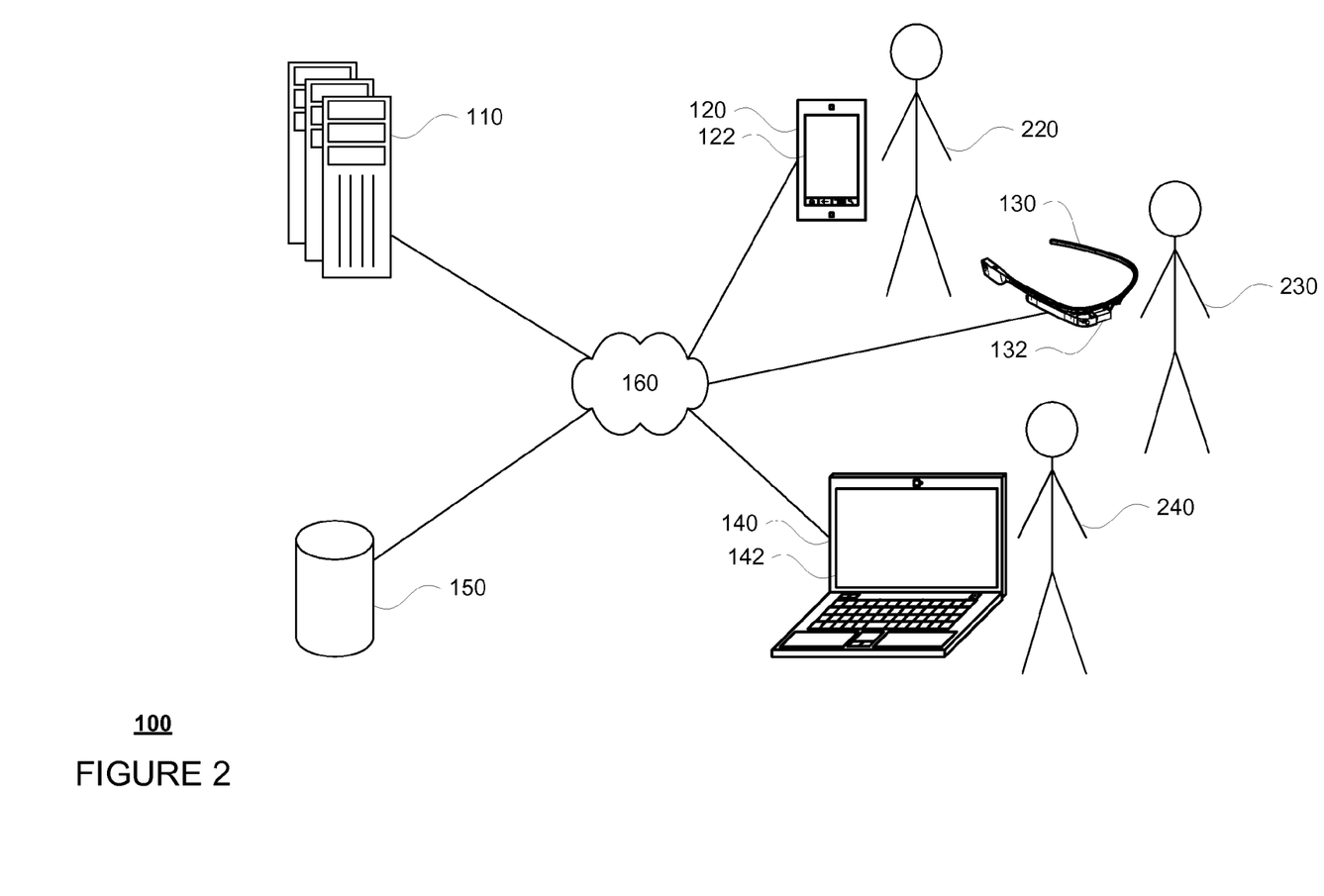
FIG. 2 is a pictorial diagram of the example system of FIG. 1.

FIGS. 1 and 2 include an example system 100 in which the features described above may be implemented. This example should not be considered as limiting the scope of the disclosure or usefulness of the features described herein. In this example as shown, system 100 includes computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, each processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160.

The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), non-transitory memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 is configured to store image information. As noted above, this image information may include 3D models as discussed above. The 3D models may be stored as texture data along with the 3D geometry data. The 3D geometry data may include a plurality of polygons defining the outlines of various objects, while the texture data may include the texture or imagery data within those polygons. The 3D geometry information may also include location information location coordinates such as latitude, longitude, altitude, etc. for the geometry. As an example, a 3D model may be stored as a triangular mesh with various textures corresponding to each triangle of the mesh.

The image information may also include 3D geometry data and texture data for rendering the same 3D model or the same location at different resolutions. The resolution of the 3D geometry and texture data may be considered an "inherent" error. In some aspects, a single rendered image may include 3D geometry data and texture data at different resolutions according to camera parameters. These camera parameters may include the zoom, aperture size, etc. of an imaginary camera having a lens located at a viewpoint of the user.

In some examples, the image information may be stored in a hierarchical model. As an example, the root of the hierarchy may describe a very large 3D model but at the coarsest available resolution. The immediate children of the root node may describe the same geometry but with finer resolution and so on until the finest level of detail available.

Figure 3:
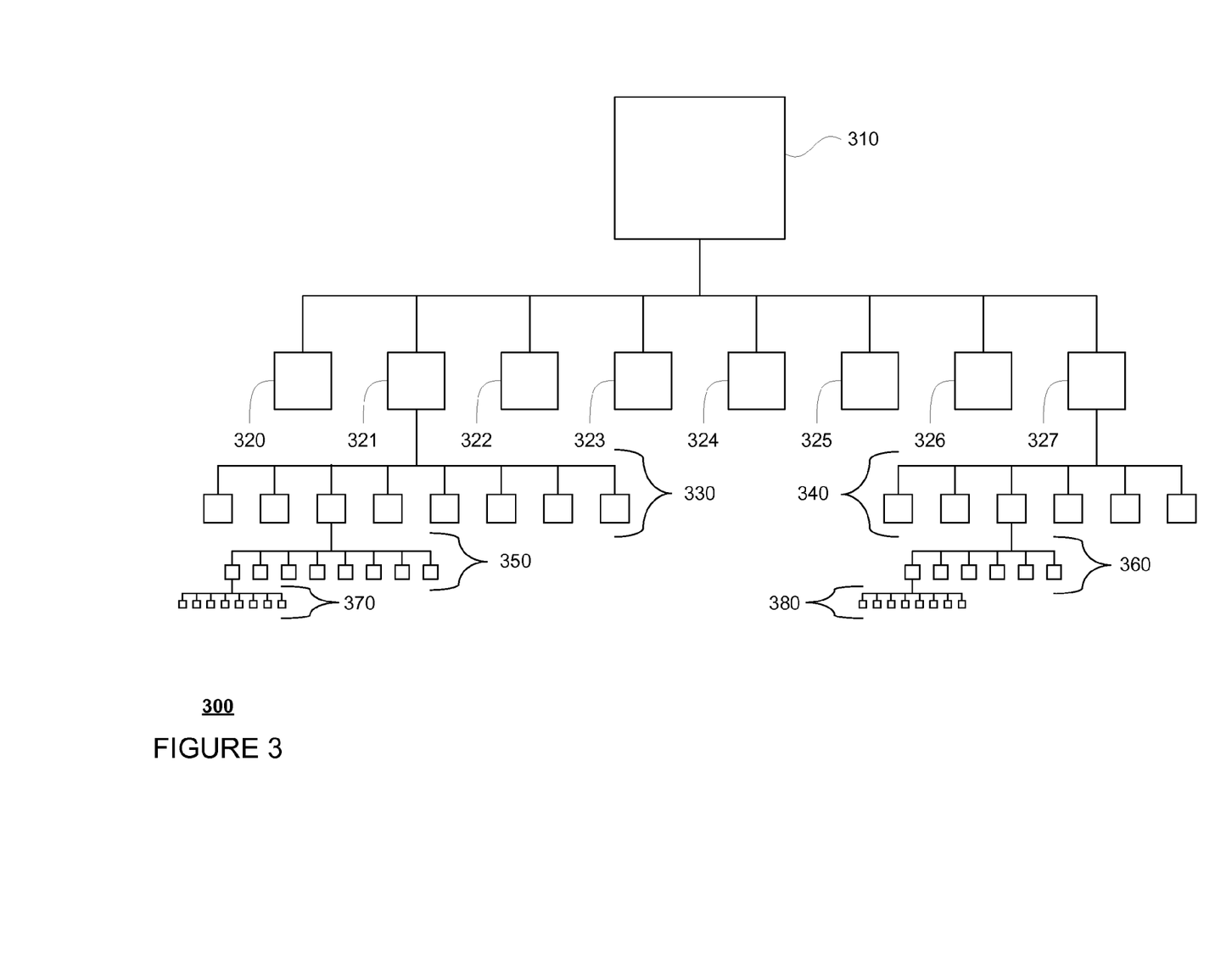
FIG. 3 is an example diagram of a node hierarchy in accordance with aspects of the disclosure.

FIG. 3 is an example 300 of a hierarchical model that may be used to store image information for a 3D model at different resolutions. In this example, a nodes corresponding to portions of a 3D model are arranged into a hierarchy based on location and resolution. In this regard, each node may be associated with resolution or accuracy information. If the model represents a location, the resolution information may provide, for example, a world space measure of the approximate maximum error of the node, for instance in meters.

Node 310 may include the coarsest resolution of the 3D model. If the 3D model is a global model, node 310 may correspond to the 3D geometry and texture data for rendering the area of the entire globe. The child nodes of node 310, namely nodes 320-327, may correspond to the 3D geometry and texture data for rendering smaller portions of the globe, but at a greater resolution than node 310. Some or all of nodes 320-327 may have a further set of child nodes. In this example, nodes 321 and 327 each have sets of child nodes, 330 and 340. Again, all or some of these nodes may have child nodes, such as nodes 330, 340, 350, 470 and 380, and so on. Some of these generations of nodes may have 8 or less nodes, such as nodes 340 and 360. In a global model, the hierarchy may have as many as 20 generations, though more or less may also be used.

As with memory 114, storage system 150 can be of any type of non-transitory storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Example Methods

A user may request to view an image of a 3D model on his or her client computing device from a particular point of view. If the user would like to view a 3D model of a particular location in a global model, the request may include information that can be used to identify a relevant portion of a 3D model, such as an address, location coordinates, landmark or business name, an image of a location, or any other such information. The point of view may correspond to a zoom level, location, and orientation from which the user may view the 3D model.

As an example, client computing device 120 may send a request to one or more of server computing devices 110 for an image of a particular location. One or more of server computing devices 110 may respond by retrieving relevant image information, including 3D geometry and texture data from one or more nodes of storage system 150, and sending it to the client computing device 120. Alternatively, client computing device 120 may retrieve the image information from local storage. Moreover the blurring, pixel mapping, and node selection aspects described below may be performed all or in part by a client computing device and/or more of server computing devices.

For instance, the nodes may be selected by the client computing device and/or one or more server computing devices using a level of detail criteria determined based on the resolution information for each node and a set of camera properties of an imaginary camera. This imaginary camera may be fixed at a position corresponding to the location and orientation of the view point of the user. Intrinsic camera properties, such as the zoom level and aperture size, may also be determined, for example, from the point of view, predetermined values, or user input. As an example, the user may be given an option to change the aperture size. The camera properties may be used to approximate how much error in pixels would be caused by rendering any given node in a particular area of a display.

One or more computing devices may then iterate through the nodes, using the camera properties, to approximate the error and using the approximation to select the nodes. If the error associated with a node is too large, for example, greater than a threshold error value, then the children of that node may be considered instead of the node that would cause too much error, and so on. The threshold error value can be expressed in pixels, such as 1 pixel width or more. The result of this iteration and selection is a list of nodes that will be below the same threshold error value and that will be queued to be rendered in order to display an image of the 3D model.

The client computing device may map the image information to the pixels of the display of client computing device and begin loading the image.

Figure 4:
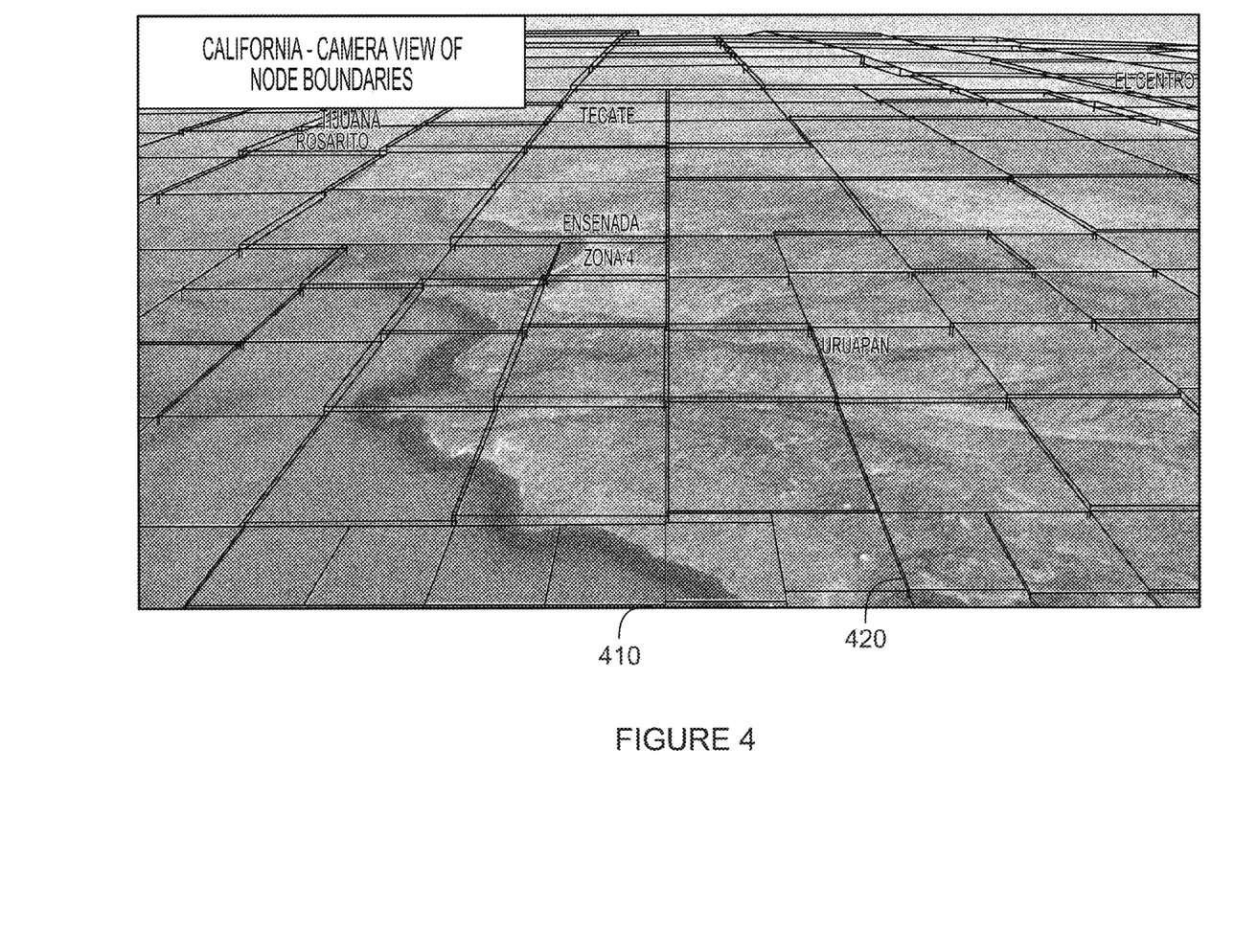
FIG. 4 is an example diagram of node data in accordance with aspects of the disclosure.

FIG. 4 is an example image 410 of a 3D model of California. In this example, the 3D model is subdivided into boxes 420. Each of these boxes represents the boundaries or bounding box of the 3D geometry of a node selected to render the image 410. Together, these boxes represent a set of nodes used to render image 410.

Figure 5:
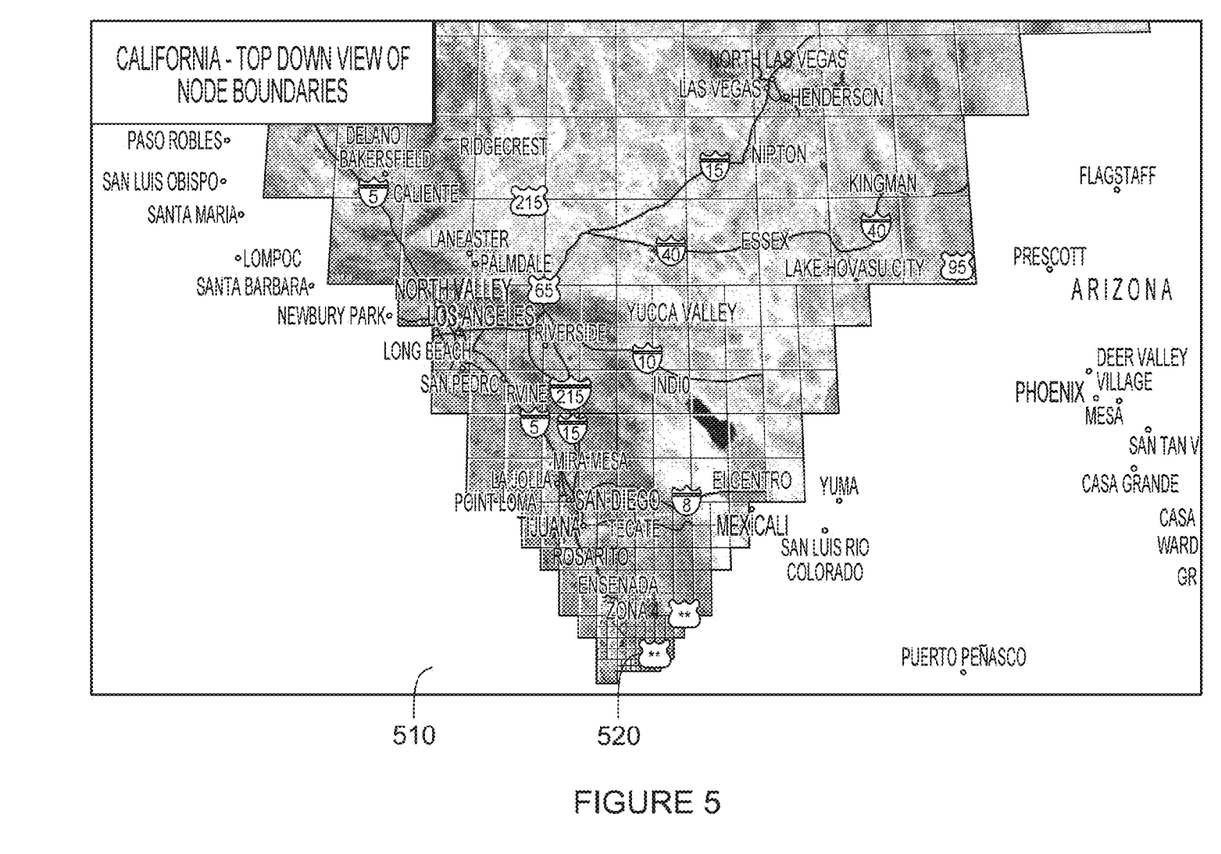
FIG. 5 is another example diagram of node data in accordance with aspects of the disclosure.

Objects closer to the viewer may be rendered in more detail with nodes of greater resolution, while objects farther from the view may be rendered in less detail or with nodes of lower resolution. FIG. 5 is an example image 510 including a frozen top-down view of image 410 including a plurality of boxes 520. Again, each of these boxes represents the boundaries or bounding box of the 3D geometry of a node selected to render the image 410. The image is frozen for the purposes of depicting the boxes from another perspective, because although the point of view changed, the image information did not. Image 510 demonstrates how different size nodes, larger nodes corresponding to lesser resolution and smaller nodes corresponding to greater resolution, may be selected to render an image. Nodes that are closer to the location of the point of view of image 510 (closer to the imaginary camera) are much smaller, and have greater resolution, than nodes that are farther from the location of the point of view (farther from the imaginary camera).

The set of nodes may be mapped to the pixels of the display of the requesting client device and blurred to simulate depth of field. The blurring may be implemented using a blur kernel. A blur kernel is a function that is used to perform the blurring and may define the weights associated with each evaluated pixel. These weights may have positive values close to a pixel being evaluated and goes to zero away from that pixel. As an example of such a function, for each particular pixel, a new pixel value may be determined by averaging all of the neighboring pixels within a radius of the circle of confusion for that particular pixel. Thus, the blur kernel may be any function that is zero if the distance to the evaluated pixel is larger than a predefined radius, here half of the diameter of the circle of confusion for that evaluated pixel, and otherwise has a constant value.

Figure 6:
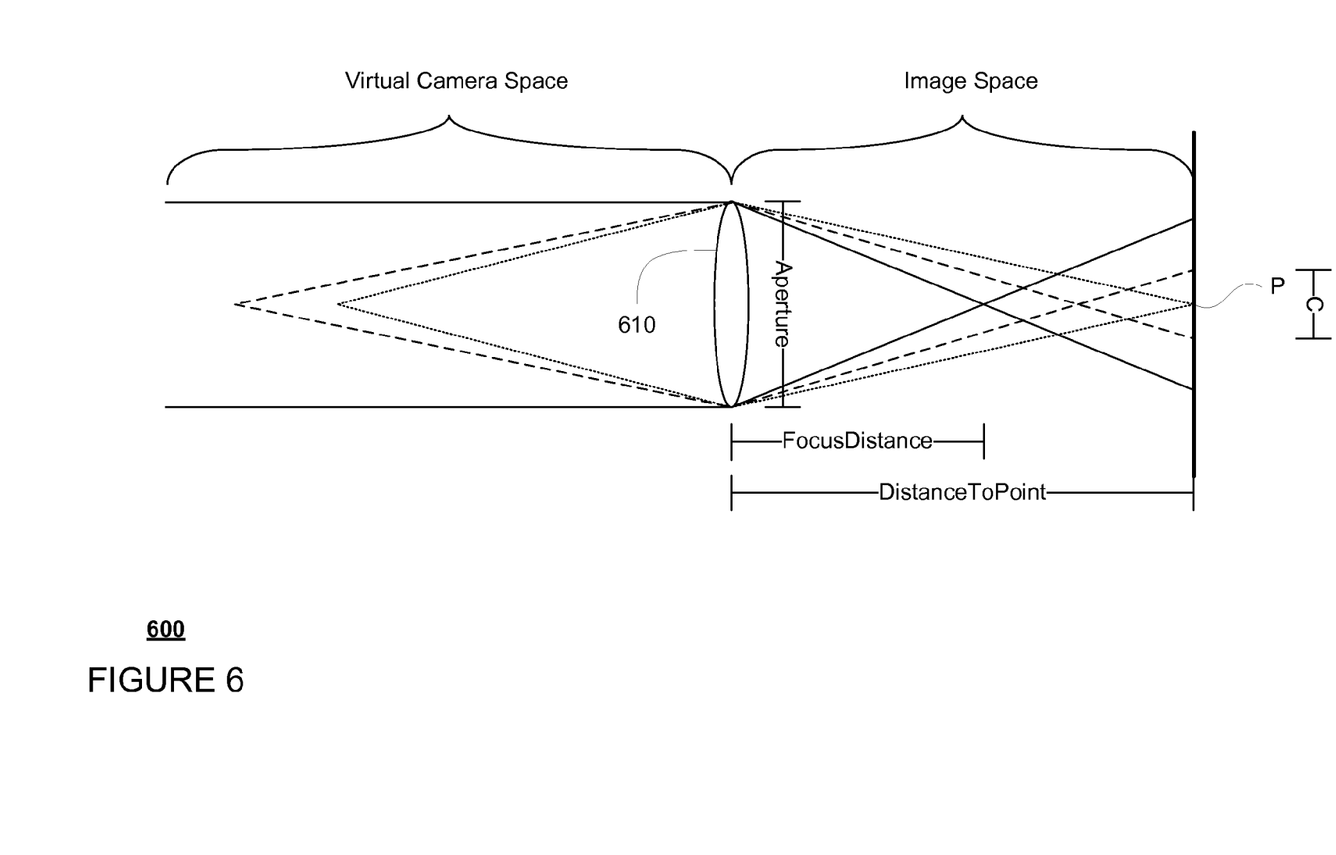
FIG. 6 is example diagram in accordance with aspects of the disclosure.

FIG. 6 is an example of a circle of confusion. In this example, a circle of confusion for point P within an image of a 3D model may be determined by $C=\text{Aperture}*(\text{DistanceToPoint}-\text{FocusDistance})/\text{DistanceToPoint}$. The value C corresponds to a diameter of a circle of confusion. Aperture corresponds to the size of the aperture 610 in the imaginary camera. DistanceToPoint corresponds to the distance from the aperture or location of the camera to the point P in the image. FocusDistance corresponds to the distance from the location of the camera to the focal plane of the image.

Figure 7:
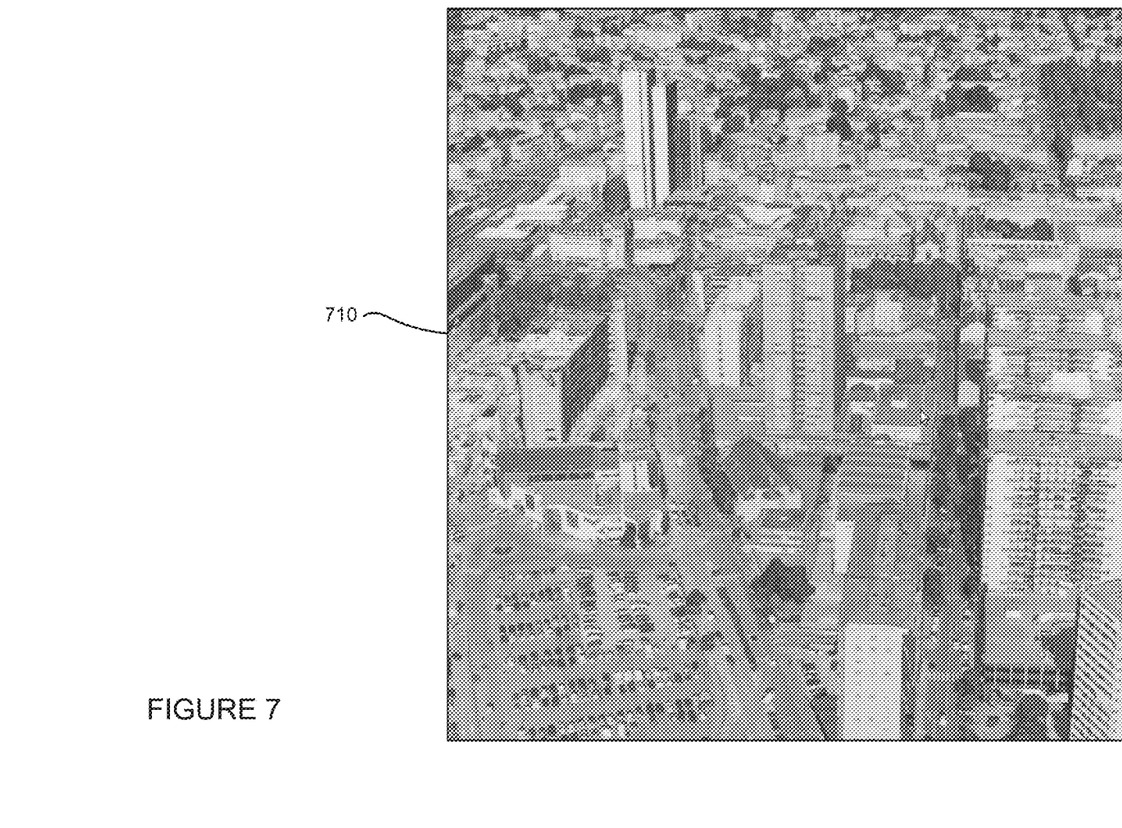
FIG. 7 is example image in accordance with aspects of the disclosure.
Figure 8:
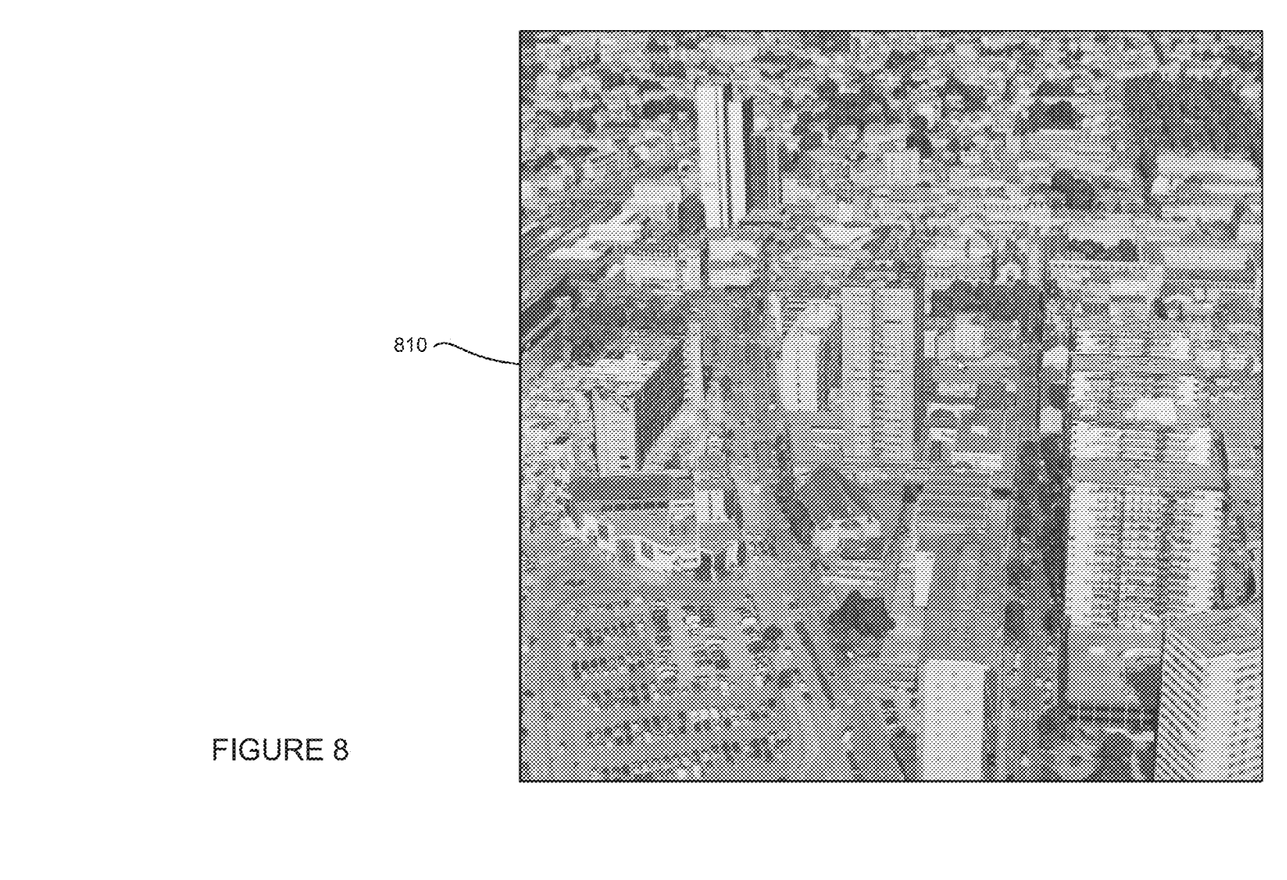
FIG. 8 is another example image in accordance with aspects of the disclosure.
Figure 9:
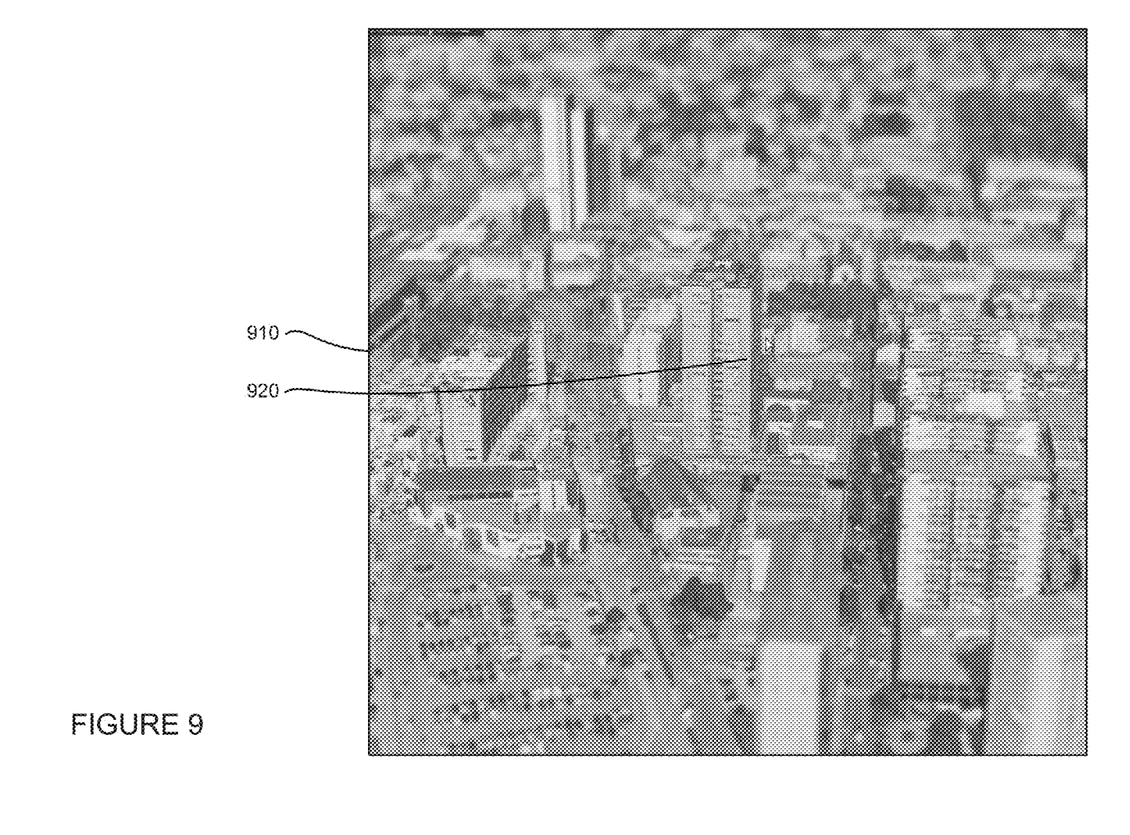
FIG. 9 is a further example image in accordance with aspects of the disclosure.

In this example, changing the Aperture value will affect the size of the diameter of the circle of confusion or the radius of the blur kernel and thus, the amount of blur. FIGS. 7, 8, and 9 illustrate example images 710, 810, and 910, respectively of a 3D model using different aperture sizes to implement the blurring. Image 710 was generated using an aperture value of 0.0, and thus, there is no intentional blurring. Image 810 was generating using a small aperture value of 0.01, giving the areas towards the outer boundaries of the image a slight, but not very noticeable, blur as compared to image 710. Image 910 was generated using a relatively large aperture value of 0.1, and thus, the blur effect is much stronger.

In addition, objects in the image that are at or near the focal plane, where $\text{DistanceToPoint} \approx \text{FocusDistance}$, will be most in focus, or less blurred. For example, objects of image 910 that are close to the focal plane, here at about the depth of building 920, may appear most in focus.

In this regard, changing focus distance may be used to change the area that will be in focus in the displayed image of the 3D model. Increasing or decreasing the FocusDistance will change the size of the circle of confusion and thus the radius of the blur kernel. Such changes may be used to focus the user's attention on a particular area of a 3D model. For example, with image 910, the viewer is immediately focused on the area around building 920, whereas there is no such focused area in image 710 where there is no blur.

In some examples, the Aperture value and FocusDistance values may be selected or adjusted by the user. For example, the Aperture value may be adjusted using an adjustment input, such as a dial, + or – input buttons, or a sliding bar. The FocusDistance may set to a user-specific location in response to a user action such as a clicking on a point in the 3D model using a mouse pointer or a finger or stylus with a touchscreen. The location of an object in the 3D model corresponding to the clicked point may be used to set the FocusDistance and redisplay the image with the clicked point now in focus. In one example, the entire image need not be repositioned relative to the user. Rather, the click point may simply come into focus. Alternatively, the imaginary camera position may appear to move to center the clicked point. In addition, the final image may be rendered immediately or in stages using an almost "auto-focus" like camera effect such that the area of the clicked point is not immediately in focus, but comes into focus over time as if a camera lens were being manipulated.

In some aspects, a minimum FocusDistance value may be used in order to fix the minimum distance into which the focal plane can be set. This can be used to strengthen or increase the blurring of objects in the foreground. In other words, the user may not be able to click on objects that are immediately in front of the user. This may also hide any errors in the 3D geometry or texture data used to render the image which are very close to the user.

Figure 10A:
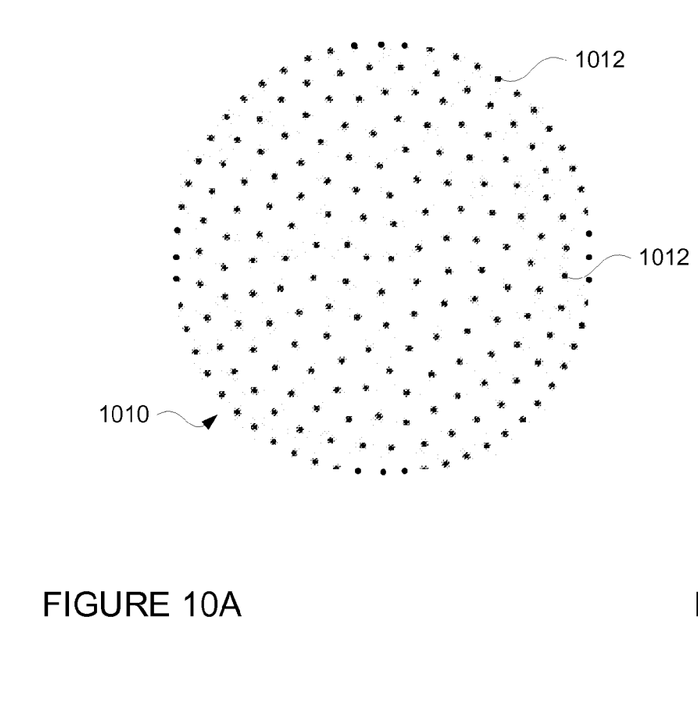
FIGS. 10A and 10B are example sampling schemes in accordance with aspects of the disclosure.
Figure 10B:
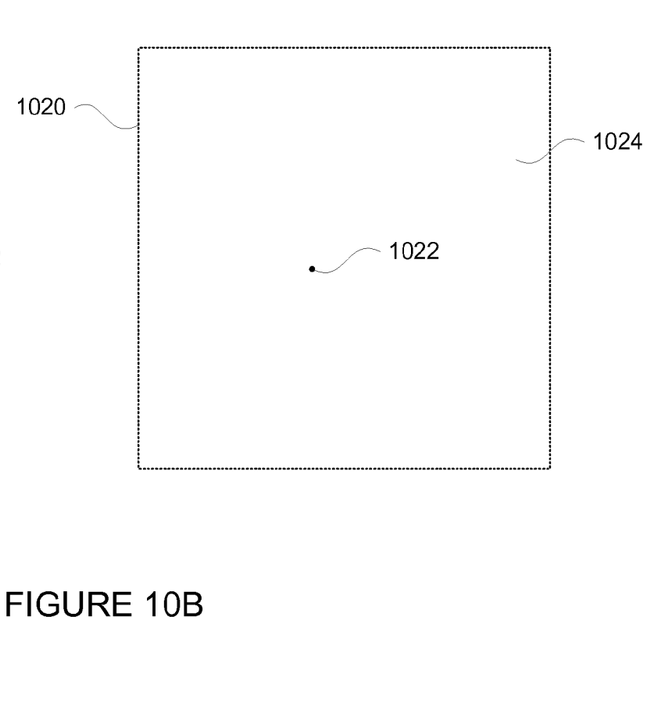

In some aspects, the blurring may be implemented by using a disk pattern to sample within the circle of confusion of a particular pixel. In one example, a Poisson disk distribution may be used. This distribution may be pre-computed and used to sample the blur for all of the pixels that are to be blurred based on the size of the diameter of the circle of confusion. FIG. 10A is an example of a sampling scheme using a pre-computing Poisson disk 1010 including a plurality of sampling points 1012. The greater the number of samples taken, the greater the amount of processing resources will be required to compute them. Thus, a small number of samples, such as 1, 5 or 29, as opposed to 50 or more, may be used. As an example, with only one sample, a random point may be sampled within a box having a width that is similar or equal to the diameter of the circle of confusion. FIG. 10B is an example of a sampling scheme including a single sampling point 1022 within a box 1024 having a width roughly equal to a diameter of a circle of confusion.

Also, to reduce the correlation of the sampling pattern at neighboring pixels, a random rotation to the pattern can be applied at each pixel. As an example, to account for the different diameters of the circle of confusion at each pixel, the pattern can be modulated by the diameter of the circle of confusion for that pixel. For instance, the radius of a pre-computed Poisson disk distribution inside of a circle, such as that shown in FIG. 10A, may be modulated using the determined diameter of the circle of confusion for the evaluated pixel in order to create a rotating disc pattern. As an example, the original distribution of samples may lie within a disk having a radius of 1 and center (0,0). To change the radius, the coordinates around the disc can be multiplied by C/2 or the radius of the determined circle of confusion for the pixel being evaluated.

The random rotations may randomize the blurring pattern in every pixel such that the pattern is somewhat uncorrelated between neighboring pixels. Because the blurring will appear to be random, the user may not be aware of the blurring or able to determine that the blurring is being done is any type of pattern. If only a small number of samples are taken, such as 1, 5, or 29, as opposed to 50 or more, the final blurred image may have the look of frosted glass. This technique also does not require that the client computing device add or remove detail from the 3D image.

Alternatively, blurring with correlated samples may appear strange or even wrong to the user. As an example, if there was only 1 sample taken at each pixel with no randomness, the image would appear to shift in the direction of the sample. So, the result would not actually even resemble a blur effect. With two samples and no randomness, the image would appear to the user as two shifted images blended together. Thus, only with a large number of samples or by using the randomness, may the image achieve a pleasing blurring effect.

The circle of confusion examples discussed above may also be used to determine a smallest diameter of the circle of confusion within a bounding box of each selected node. As noted above with regard to FIGS. 4 and 5, the bounding box of a node may include a box that tightly contains the geometry associated with the node. The smallest diameter of a circle of confusion may be determined for a given selected node by selecting a point of geometry within the bounding box having the smallest distance to the focal plane or the point having a distance or a DistanceToPoint value from the imaginary camera that is closest to the FocusDistance. At that DistanceToPoint value, a circle of confusion may be computed, again using the aperture size and FocusDistance as in the circle of confusion described above.

The smallest circle of confusion for each selected node may be compared to the threshold error value used to select the nodes. When the circle of confusion for a given selected node has a diameter that is less than or equal to the threshold error value, the selected node may be used to display a final image of the 3D model on the display of the client computing device.

When the circle of confusion for a given selected node has a diameter that is larger than the threshold error value, the diameter of the circle of confusion may be used to adjust the threshold error value. As an example, the diameter of the circle of confusion may be applied as a multiplier to the threshold value. For example, if the smallest diameter of a circle of confusion for a given selected is 1.5 pixels and the threshold error value is 1 pixel, the adjusted threshold error value may be 1.5 pixels.

Any adjusted threshold error value may be used to select a different node to replace the given selected node with the corresponding adjusted threshold error value. For example, another node may be selected from storage system 150 having resolution information that is closest to, but no greater than the adjust threshold error value as described above with the initial selection of the nodes. Thus, the different node may have a coarser resolution that the given selected node. This different node may be considered a replacement node as it may replace the given selected node in the set of selected nodes.

The final set of selected nodes may be used to render and display a final image of the 3D model. The 3D geometry and texture data of any replacement node corresponding to the area of given selected node may thus be used to display a final image of the 3D model on the display of the client computing device.

Figure 11:
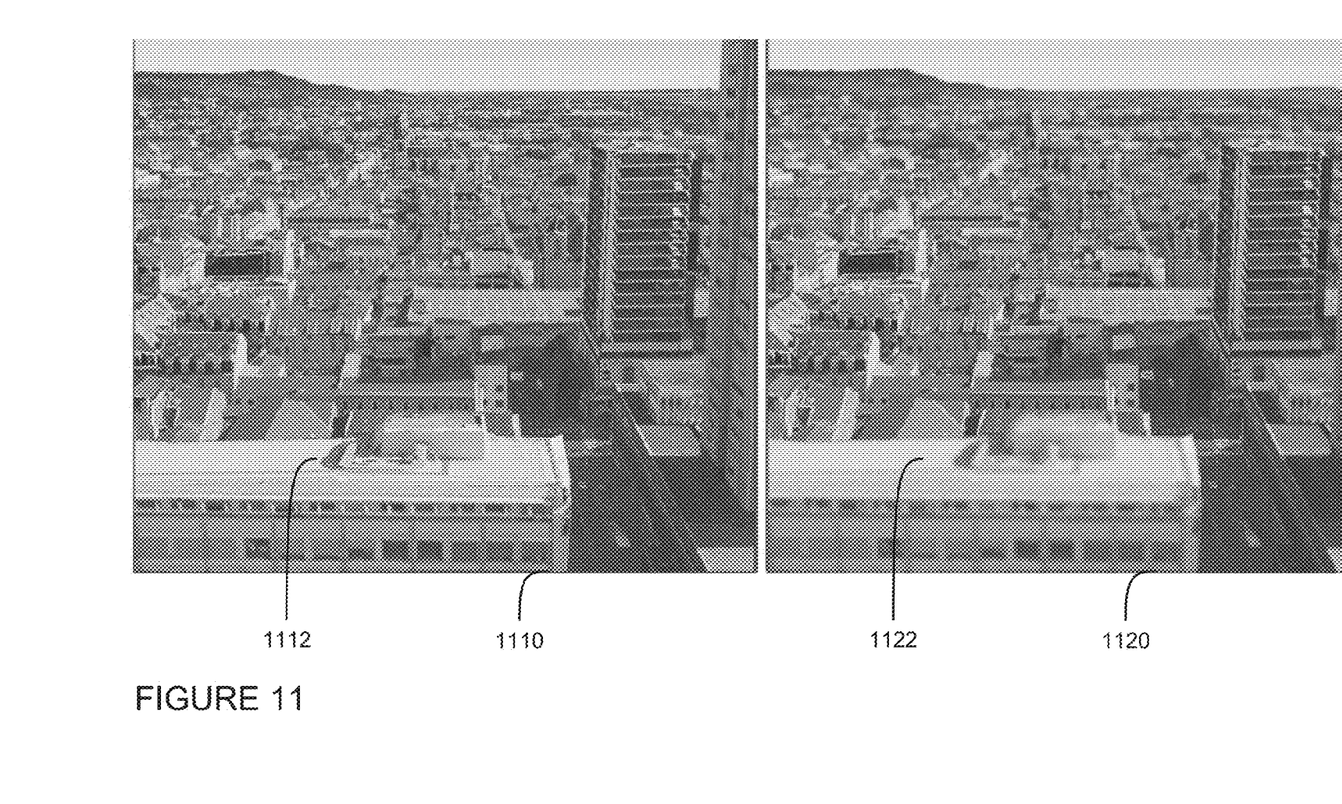
FIG. 11 is example comparison of images of 3D models in accordance with aspects of the disclosure.

FIG. 11 is a comparison of images 1110 and 1120. Image 1110 is an example image of a 3D model without any depth of field blurring. In this example, 538 nodes were used. Image 1120 is an example image of the same 3D model as image 1110 with depth of field blurring and using the adjusted error value to select different nodes. In this example, only 383 nodes were used. In addition, the aperture value of image 1120 was larger than that of 1110. This is a significant difference that may actually reduce the amount of processing power required to display image 1120 as compared to image 1110. Although there may be some cost in sampling the circle of confusion data to implement the blur, this may be made small enough, by using fewer samples and reducing the number of nodes, that it becomes more efficient to use the depth of field blurring than to render an entire image, such as image 1110, at a higher resolution.

Figure 12:
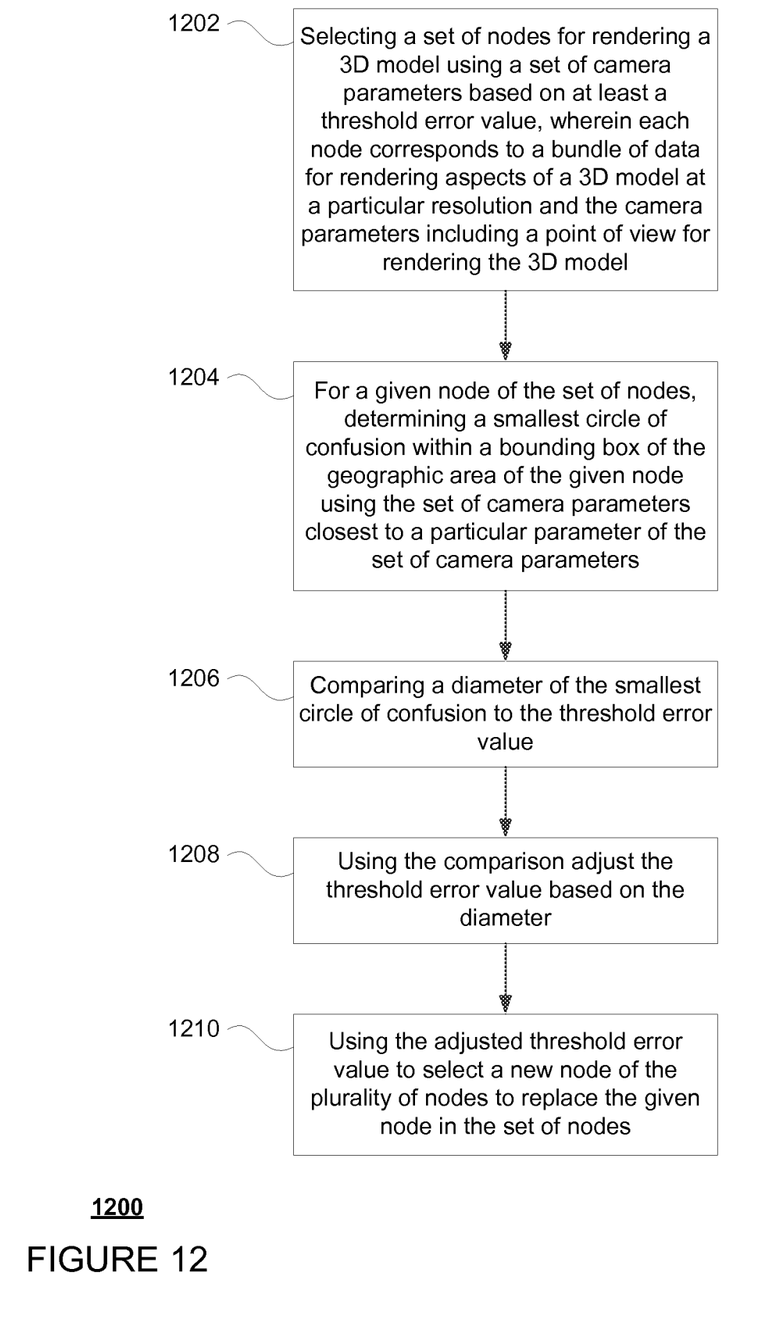
FIG. 12 is a flow diagram in accordance with aspects of the disclosure.

Flow diagram 1200 of FIG. 12 is an example of steps that may be performed by one or more computing devices, such as server computing devices 110 and/or client computing devices 120, 130, and 140, in accordance with aspects of the technology described herein. In this example, a set of nodes for rendering aspects of a 3D model is selected from a plurality of nodes at block 1202. The set of nodes are selected using a set of camera parameters based on at least a threshold error value. Each node of the plurality of nodes corresponds to a bundle of data for rendering a 3D model at a particular resolution. The camera parameters including a point of view for rendering the 3D model.

For a given node of the set of nodes, a smallest circle of confusion within a bounding box of the geographic area of the given node is determined at block 1204. The smallest circle of confusion is determined using the set of camera parameters closest to a particular parameter of the set of camera parameters. A diameter of the smallest circle of confusion is compared to the threshold error value at block 1206. The comparison is used to adjust the threshold error value based on the diameter at block 1208. This adjusted threshold error value is then used to select a new node to replace the given node in the set of nodes at block 1210.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   selecting, by one or more computing devices, from a plurality of nodes, a set of nodes for rendering a 3D model using a set of camera parameters based on at least a threshold error value, each node corresponding to a bundle of data for rendering aspects of the 3D model at a particular resolution and the set of camera parameters including a point of view for rendering the 3D model;
   for a given node of the set of nodes, determining, by the one or more computing devices, a smallest circle of confusion within a bounding box of a geographic area of the given node using the set of camera parameters closest to a particular parameter of the set of camera parameters;
   comparing, by the one or more computing devices, a diameter of the smallest circle of confusion to the threshold error value;
   adjusting, by the one or more computing devices, the threshold error value based at least in part on the diameter and the comparison; and
   selecting, by the one or more computing devices, a new node of the plurality of nodes to replace the given node in the set of nodes based on at least in part the adjusted threshold error value.

2. The method of claim 1, further comprising rendering the 3D model using the set of nodes including the new node.

3. The method of claim 1, further comprising adjusting the comparison to adjust the threshold error value only when the diameter of the smallest circle of confusion is greater than the threshold error value.

4. The method of claim 1, wherein the new node has a coarser particular resolution than the given node.

5. The method of claim 1, wherein the particular parameter is a focal distance for the 3D image.

6. The method of claim 1, wherein adjusting the threshold error value includes multiplying the diameter by the threshold error value.

7. The method of claim 1, further comprising:
   receiving user input indicating a focus point; and
   wherein selecting the set of nodes is further based on the focus point.

8. The method of claim 7, further comprising using the focus point to determine a focal distance, and the focal distance is the particular parameter of the set of camera parameters.

9. A system comprising one or more computing devices, the one or more computing devices each having one or more processors, the one or more computing devices being configured to:
   select, from a plurality of nodes, a set of nodes for rendering aspects of a 3D model using a set of camera parameters based on at least a threshold error value, each node corresponding to a bundle of data for rendering aspects of the 3D model at a particular resolution and the set of camera parameters including a point of view for rendering the 3D mode;
   for a given node of the set of nodes, determine a smallest circle of confusion within a bounding box of a geographic area of the given node using the set of camera parameters closest to a particular parameter of the set of camera parameters;
   compare a diameter of the smallest circle of confusion to the threshold error value;
   adjust the threshold error value based at least in part on the diameter and the comparison; and
   select a new node of the plurality of nodes to replace the given node in the set of nodes based on at least in part the adjusted threshold error value to select.

10. The system of claim 9, wherein the one or more computing devices are further configured to render the 3D model using the set of nodes including the new node.

11. The system of claim 9, wherein the new node has a coarser particular resolution than the given node.

12. The system of claim 9, wherein the particular parameter is a focal distance for the 3D image.

13. The system of claim 9, wherein the one or more computing devices are further configured to adjust the threshold error value by multiplying the diameter by the threshold error value.

14. The system of claim 9, wherein the one or more computing devices are further configured to:
receive user input indicating a focus point; and
select the set of nodes further based on the focus point.

15. The system of claim 14, wherein the one or more computing devices are further configured to use the focus point to determine a focal distance, and the focal distance is the particular parameter the set of camera parameters.

16. A non-transitory computer-readable storage medium including instructions, the instructions when executed by one or more processors, cause the one or more processors to perform a method, the method comprising:
selecting from a plurality of nodes, a set of nodes for rendering a 3D model using a set of camera parameters based on at least a threshold error value, each node corresponding to a bundle of data for rendering aspects of the 3D model at a particular resolution and the set of camera parameters including a point of view for rendering the 3D mode;
for a given node of the set of nodes, determining a smallest circle of confusion within a bounding box of a geographic area of the given node using the set of camera parameters closest to a particular parameter of the set of camera parameters;
comparing a diameter of the smallest circle of confusion to the threshold error value;
adjusting the threshold error value based at least in part on the diameter and the comparison; and
selecting a new node of the plurality of nodes to replace the given node in the set of nodes based on at least in part the adjusted threshold error value.

17. The medium of claim 16, wherein the method further comprises rendering the 3D model using the set of nodes including the new node.

18. The medium of claim 16, wherein the method further comprises adjusting the threshold error value only when the diameter of the smallest circle of confusion is greater than the threshold error value.

19. The medium of claim 16, wherein the new node has a coarser particular resolution than the given node.

20. The medium of claim 16, wherein the particular parameter is a focal distance for the 3D image.

* * * * *